(No Model.) 2 Sheets—Sheet 2.

J. T. WARREN.
HOT AIR FURNACE.

No. 601,822. Patented Apr. 5, 1898.

Witnesses. Inventor.
Jabez T. Warren
by W. T. Miller
Attorney.

UNITED STATES PATENT OFFICE.

JABEZ T. WARREN, OF BUFFALO, NEW YORK.

HOT-AIR FURNACE.

SPECIFICATION forming part of Letters Patent No. 601,822, dated April 5, 1898.

Application filed November 12, 1897. Serial No. 658,341. (No model.)

*To all whom it may concern:*

Be it known that I, JABEZ T. WARREN, a citizen of the United States, residing at Buffalo, in the county of Erie and State of New York, have invented certain new and useful Improvements in Hot-Air Furnaces; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates to improvements in hot-air furnaces, its principal object being to increase the radiating-surface by means of which the air is heated in its transit through the furnace.

To that end my invention consists in the combination, with the fire-box and smoke-pipe of a furnace, of a series of separated drums communicating with each other and with the fire-box and smoke-pipe and arranged within the hot-air chamber, a series of diaphragms of less diameter than the drums and centrally arranged therein, whereby the heat generated in the fire-box has passing contact with the entire radiating-surface of the drums, a series of openings in the diaphragms, and a series of dampers operating with the openings in the diaphragms to produce a direct draft from the fire-box to the smoke-pipe when desired.

My invention consists, further, of other details of construction, all of which will be hereinafter described and claimed.

Figure 1:
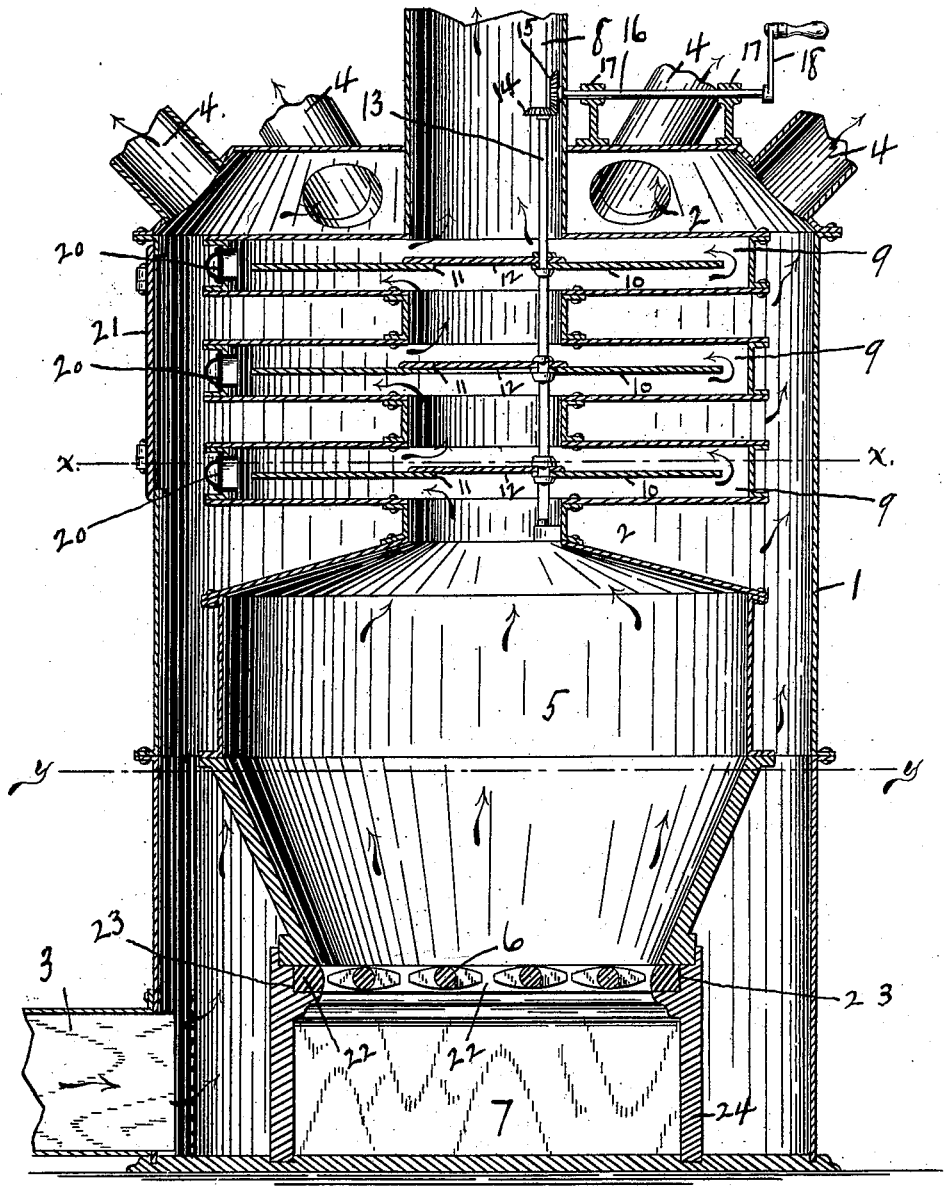
Figure 2:
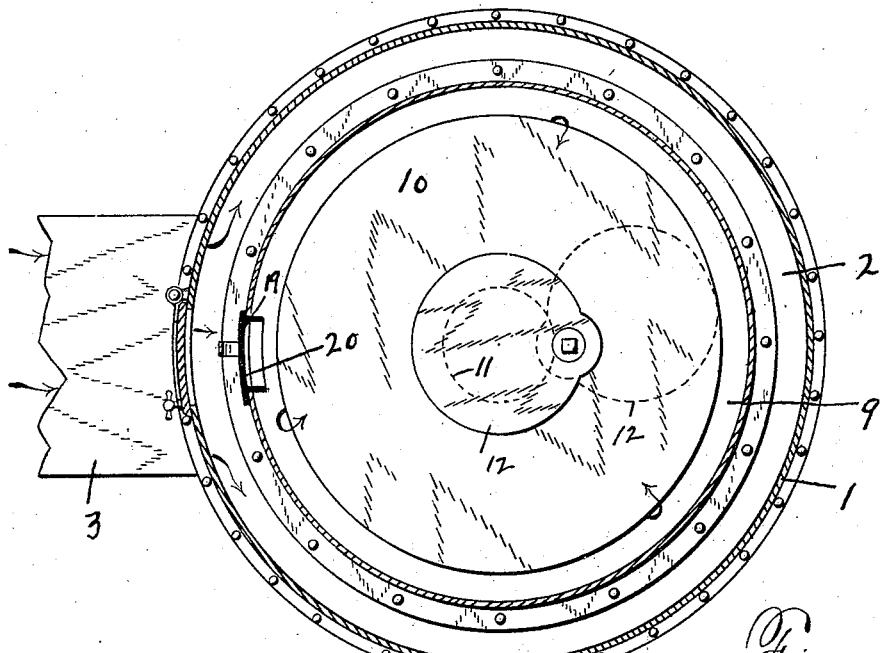
Figure 3:
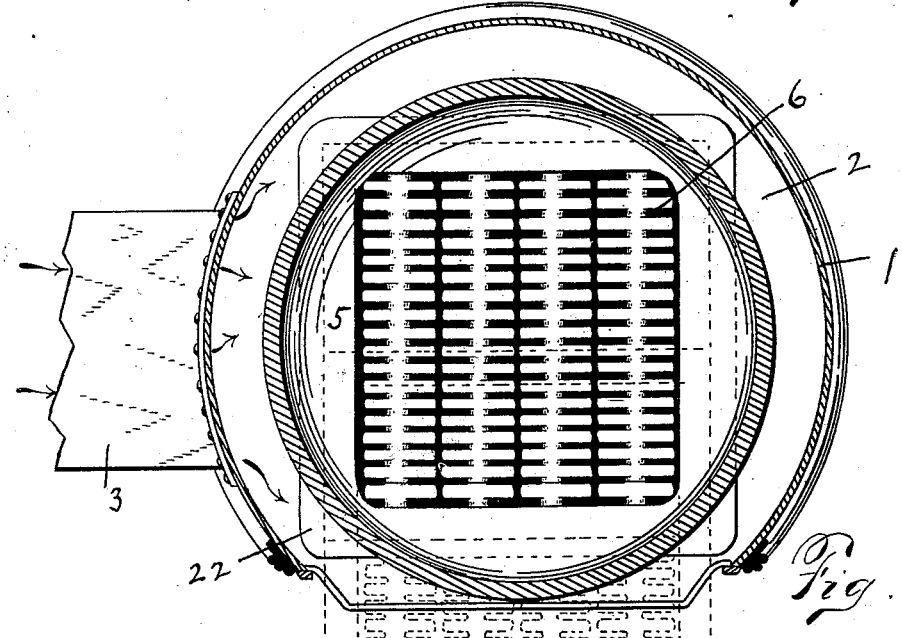

In the drawings, Figure 1 is a central vertical section of my improved furnace. Fig. 2 is a horizontal section taken on the line $x$ $x$ of Fig. 1, and Fig. 3 is a similar section taken in the line $y$ $y$ of Fig. 1.

Referring to the drawings, 1 is the cylindrical casing of the furnace, the interior of which forms the hot-air chamber 2.

3 is the cold-air box opening into the chamber 2, and 4 4 are the hot-air flues leading from the hot-air chamber 2 to the registers.

5 is the fire-box; 6, the grate-bars; 7, the ash-pit, and 8 the smoke-pipe.

The fire-box 5 or combustion-chamber is preferably made low, as shown, in order to leave considerable space between it and the roof of the casing 1. Within this space are arranged a series of drums 9, preferably of sheet metal. These drums are of less diameter than the casing 1 and are preferably shallow. They communicate centrally with each other, the top drum opening into the smoke-pipe 8 and the bottom drum opening into the fire-box 5. These drums are separated from each other, as shown, to admit of a free circulation between the same of the air entering from the box 3.

Within each drum 9 is centrally secured in any well-known manner a diaphragm 10, which is of less diameter than the drum. 11 is a central opening in each diaphragm, which is covered or uncovered by a damper 12. These dampers 12 are rigidly secured to a vertical shaft 13, which passes down from the smoke-pipe 8 through the drums 9. The upper end of shaft 13 has the bevel-gear 14, which intermeshes with the bevel-gear 15 upon the shaft 16, which is mounted in the journals 17 17 upon the roof of the casing 1, a crank 18 at its outer end being used to turn the same. Each drum 9 has a side opening, in which is removably fitted a cover 20, and opposite these covers 20 is the door 21, by means of which access is had to the covers 20 to remove the same when it is found necessary to clean the drums 9 of the accumulations from the fire-box.

In operation when the fire is started the crank 18 is turned to swing the dampers 12 free of the openings 11 in the diaphragms 10, as shown in dotted lines in Fig. 2. This leaves a direct draft-passage from the fire-box 5 to the smoke-pipe 8. When the fire has obtained a good start, the crank 18 is turned in the opposite direction, which causes the dampers to be swung back over the openings 11, as shown in Fig. 1. The heat from the fire-box 5 now passes successively through the drums 9, and by reason of the central position of the diaphragms 10 is caused to pass in contact with the entire radiating-surface of each drum before passing out into smoke-pipe 8. In this manner an immense increase in radiating-surface is obtained over the hot-air furnaces now in use, and the air from the cold-air box 3, circulating freely around and between the drums 9, is in this manner more quickly heated and raised to a much higher temperature than heretofore. Then, too, with my improved construction much less fuel is required, as the heat generated is thereby utilized to a maximum degree by being distributed along the entire radiating-surfaces of the drums before passing out into the smoke-pipe.

The grate-bars 6 are mounted in the frame 22, which slides in the ways 23 in the furnace-base 24. With this construction the grate-bars 6 can be quickly and easily slid out for the purpose of cleaning or repairs.

I claim—

In a hot-air furnace the combination with the fire-box and smoke-pipe, of a series of separated drums communicating with each other and with the fire-box and smoke-pipe and arranged within the hot-air chamber, a series of diaphragms of less diameter than the drums and centrally arranged therein whereby the heat generated in the fire-box has passing contact with the entire radiating-surface of the drums, and a series of openings in the diaphragms and a series of dampers operating with the openings in the diaphragms to produce a direct draft from the fire-box to the smoke-pipe when desired.

In testimony whereof I have signed my name to this specification in the presence of two subscribing witnesses.

JABEZ T. WARREN.

Witnesses:
W. T. MILLER,
C. B. BUTLER.